US008679695B2

(12) United States Patent
Backstrom

(10) Patent No.: US 8,679,695 B2
(45) Date of Patent: Mar. 25, 2014

(54) CELL STACK SYSTEM

(75) Inventor: Andreas Karl Backstrom, Guildford Surrey (GB)

(73) Assignee: AFC Energy plc (GB)

( * ) Notice: Subject to any disclaimer, the term of this patent is extended or adjusted under 35 U.S.C. 154(b) by 0 days.

(21) Appl. No.: 13/577,656

(22) PCT Filed: Feb. 4, 2011

(86) PCT No.: PCT/GB2011/050190
§ 371 (c)(1),
(2), (4) Date: Aug. 7, 2012

(87) PCT Pub. No.: WO2011/095815
PCT Pub. Date: Aug. 11, 2011

(65) Prior Publication Data
US 2012/0308909 A1     Dec. 6, 2012

(30) Foreign Application Priority Data

Feb. 8, 2010    (GB) .................................. 1001972.7

(51) Int. Cl.
*H01M 8/04*   (2006.01)
*H01M 8/24*   (2006.01)

(52) U.S. Cl.
USPC ............................ 429/451; 429/450; 429/471

(58) Field of Classification Search
USPC ............................ 429/408, 63, 450–471, 101
See application file for complete search history.

(56) References Cited

U.S. PATENT DOCUMENTS

| 4,612,262 A * | 9/1986 | Grevstad ....................... 429/442 |
| 4,702,972 A * | 10/1987 | Matsumoto ................... 429/450 |
| 2005/0158597 A1* | 7/2005 | Saitou ............................. 429/22 |
| 2011/0223496 A1* | 9/2011 | Makita et al. ................. 429/409 |

FOREIGN PATENT DOCUMENTS

| EP | 107396 A1 * | 5/1984 | ............. H01M 8/04 |
| WO | WO 2009017150 A1 * | 2/2009 | ............. H01M 8/18 |

* cited by examiner

*Primary Examiner* — Patrick Ryan
*Assistant Examiner* — Kiran Quraishi
(74) *Attorney, Agent, or Firm* — Tumey L.L.P.

(57) ABSTRACT

A system (10) for supplying a liquid electrolyte to cell stacks (32) arranged at a plurality of different heights comprises a plurality of constant head supply tanks (12) for containing liquid electrolyte, one for each of the different heights. Each such supply tank (12) is adapted to ensure that the surface of the liquid electrolyte is at atmospheric pressure, and to feed electrolyte to a cell stack, and incorporates an overflow duct (18) to keep the electrolyte at a constant level. For each supply tank (12) except the lowest, the overflow duct (18) supplies overflowing electrolyte to a supply tank at a lower height. The system also includes an electrolyte storage tank (20), and means (24, 26) to supply electrolyte from the storage tank (20) to the highest supply tank (12).

11 Claims, 2 Drawing Sheets

CELL STACK SYSTEM

Figure 1:
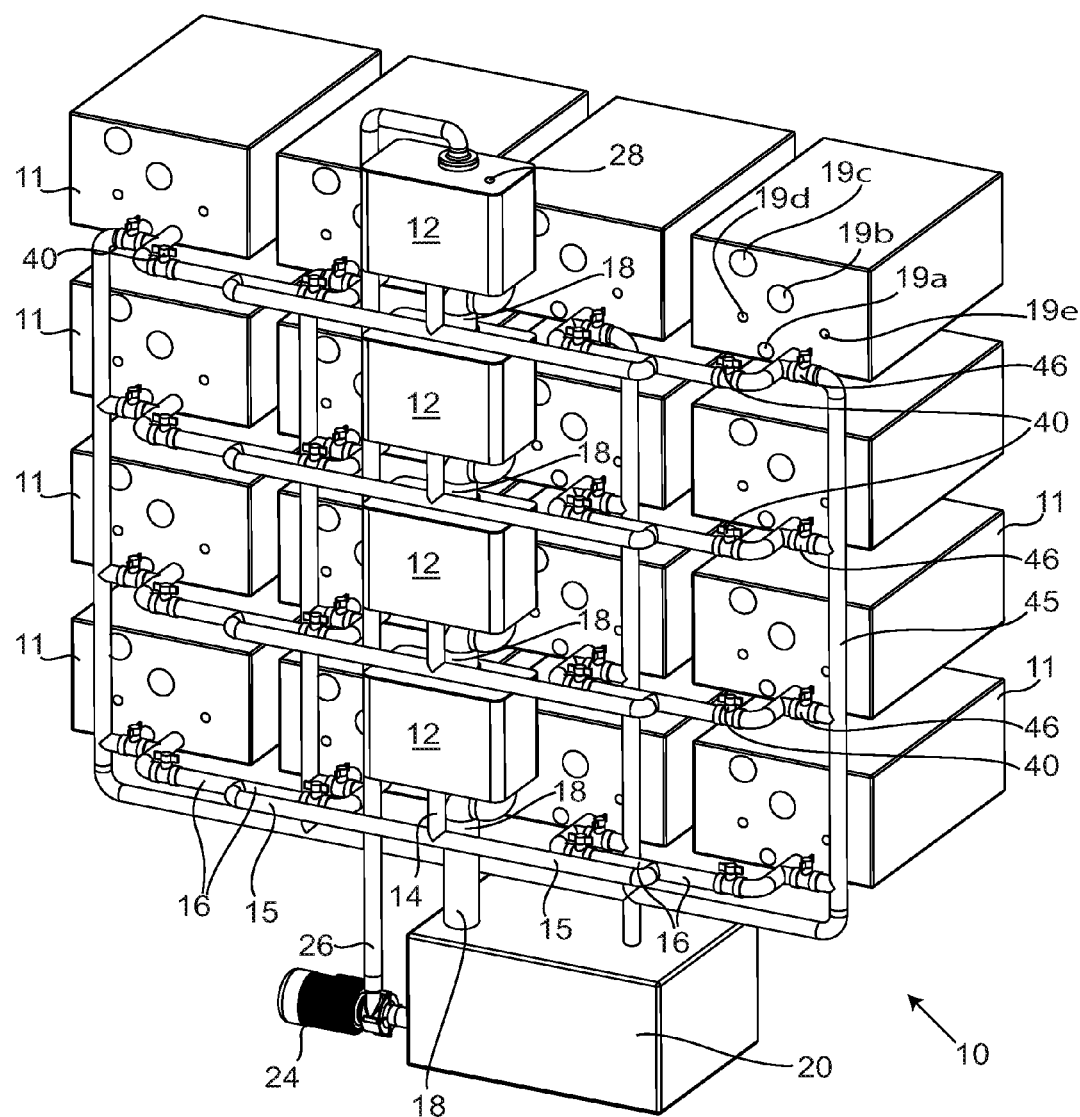

The present invention relates to a system that includes several cell stacks, enabling a liquid to flow through all the cell stacks.

BACKGROUND TO THE INVENTION

Fuel cells have been identified as a relatively clean and efficient source of electrical power. Alkaline fuel cells are of particular interest because they operate at relatively low temperatures, are efficient and suitable for operation in an industrial environment. Acid fuel cells and fuel cells employing other aqueous electrolytes are also of interest. Such fuel cells typically comprise an electrolyte chamber separated from a fuel gas chamber (containing a fuel gas, typically hydrogen) and a further gas chamber (containing an oxidant gas, usually air). The electrolyte chamber is separated from the gas chambers using electrodes. Typical electrodes for alkaline fuel cells comprise a conductive metal mesh, typically nickel, that provides mechanical strength to the electrode. Onto the metal mesh is deposited a catalyst which may for example contain activated carbon and a catalyst metal such as platinum. A single fuel cell does not produce a large voltage, and it is usually desirable to assemble a number of fuel cells into a stack to provide a larger electrical power output.

For some purposes it may be necessary to assemble a number of such stacks, to provide still greater electrical power output; and in this context there is a problem of providing the electrolyte to each of the stacks, and ensuring sufficiently uniform flow. If the electrodes are arranged in substantially horizontal planes in a stack and are fed from a common source there will be a significant pressure difference between electrolyte chambers at different heights in the stack. If the electrodes are arranged in substantially vertical planes in a stack, there will be a pressure difference between the top and bottom of each electrolyte chamber. For an aqueous electrolyte the pressure difference is about 15 mbar (1.5 kPa) over a height difference of 150 mm. In fuel cell, the electrical performance of the cell is sensitive to any such pressure variations, so the pressure variations within a cell stack and between different cell stacks should be minimised.

DISCUSSION OF THE INVENTION

The system of the present invention addresses or mitigates one or more problems of the prior art.

There is provided in accordance with the present invention a system for supplying a liquid electrolyte to cell stacks arranged at a plurality of different heights, with at least one cell stack at each different height, the system comprising a plurality of supply tanks for containing liquid electrolyte, one for each of the different heights, each supply tank being adapted to ensure that the surface of the liquid electrolyte is at atmospheric pressure and adapted to feed electrolyte to at least one cell stack, an electrolyte storage tank, and means to supply electrolyte from the electrolyte storage tank to the highest supply tank, wherein each supply tank incorporates an overflow weir and an outlet duct communicating with the weir, for each supply tank except the lowest supply tank the outlet duct being arranged to supply overflowing electrolyte to a supply tank at a lower height.

The cell stacks are preferably cell stacks through which electrolyte flows continuously, and out flowing electrolyte from each cell stack may be supplied to the electrolyte storage tank. This may simply involve a passive drainage duct communicating with the electrolyte storage tank, although it may also comprise a pump. The outlet from each cell stack may include a flow restriction, for example a restricting aperture through a plate, or an adjustable valve.

Where there are a plurality of cell stacks at the same height, all these cell stacks are preferably fed from the same supply tank by respective feed ducts. The pressure drop along each feed duct should be substantially the same. For example these may be feed ducts of equal lengths and widths; or a single feed duct may split into a plurality of feed ducts each of substantially equal length and width; each of these feed ducts may again split into a plurality of feed ducts so as to form a tree structure of successive splits.

Preferably the electrolyte storage tank is below the lowest supply tank, and the outlet duct from the lowest supply tank feeds into the electrolyte storage tank. Preferably the means to supply electrolyte to the highest supply tank comprises a pump. In a modification the system may comprise a sump below the lowest supply tank, in which the used electrolyte is collected, and a pump to supply electrolyte from the sump into an electrolyte storage tank that is above the highest supply tank. In this embodiment the electrolyte storage tank may itself incorporate a constant head overflow feeding back to the sump, so ensuring that electrolyte is fed into the uppermost supply tank at a constant rate.

In a preferred embodiment the electrolyte is arranged to flow through each cell stack in a generally upward direction, being fed into the cell stack near the bottom of the cell stack and flowing upwardly through the electrolyte chambers to emerge from the outlet, this outlet being near the top of the cell stack. Preferably the out-flowing electrolyte emerging from the outlet is at near atmospheric pressure. For example each cell stack may be surrounded by a tank or box into which the out-flowing electrolyte flows, the electrolyte trickling out of the cell stack into the tank, and then trickling out of an outflow duct to return to the sump or to the electrolyte storage tank.

In this preferred embodiment, where the cell stacks are fuel cell stacks that are being fed with a through flow of air, and are also being provided with a fuel gas such as hydrogen, then the air is also collected in the tank or box surrounding the cell stack, and is extracted through the same outflow duct. If there is any leakage of the fuel gas from the fuel cell stack, it will be carried along with the air flow and thereby diluted. The system may incorporate a sensor to detect any hydrogen in the air flow.

Thus the system provides a simple and straightforward way of supplying electrolyte to a number of different cell stacks at different heights, using a single pump. The adjustable valve that provides the flow restriction at the outlet of each cell stack may need to be adjusted during setup of the system, but should not subsequently require adjustment.

The system is particularly suited to fuel cell stacks, but it may also be utilised with electrolysis cell stacks, for example for electrolysis of water to generate hydrogen and oxygen.

Figure 2:
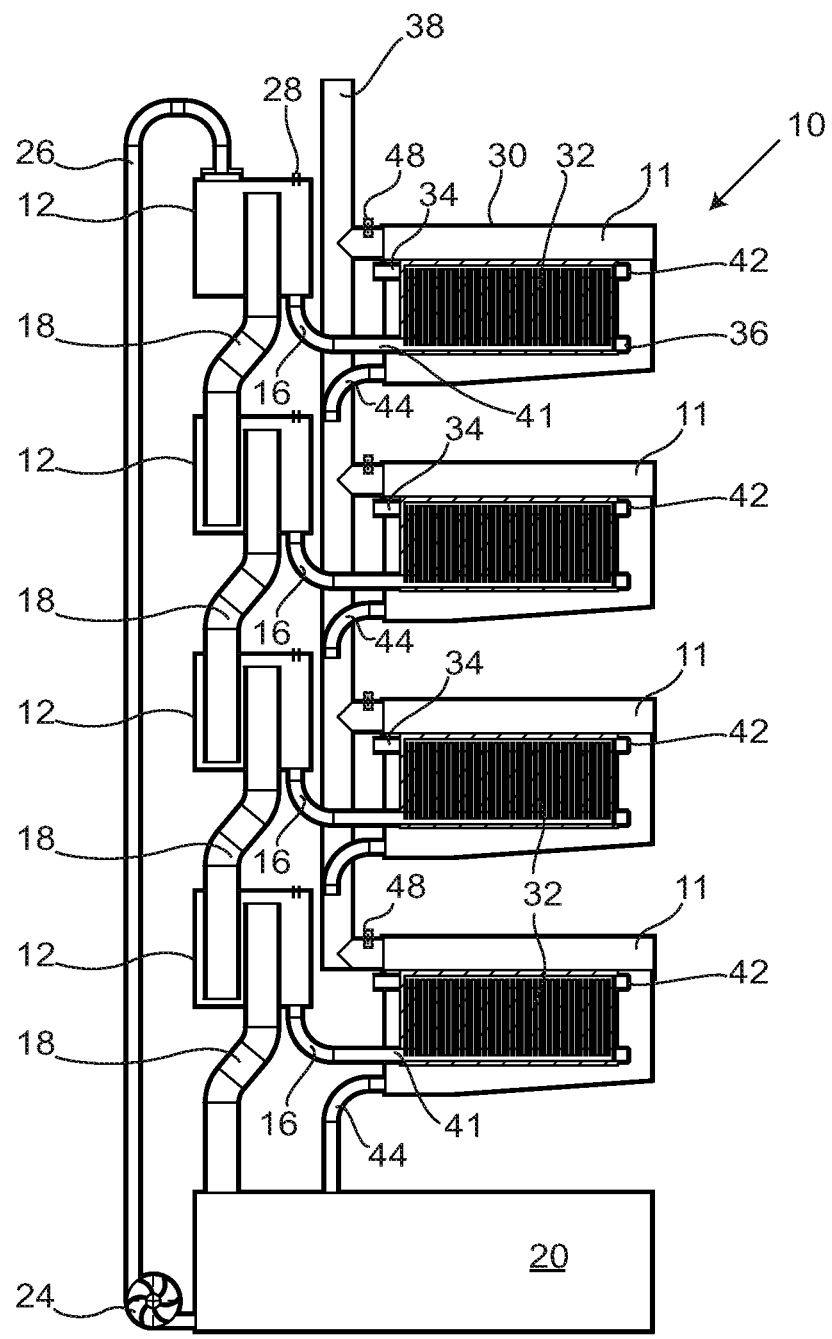

The invention will now be further and more particularly described, by way of example only, and with reference to the accompanying drawings in which:

FIG. 1 shows a perspective view of a system of the invention incorporating sixteen fuel cell stacks arranged at four different levels; and FIG. 2 shows a vertical sectional diagram showing the flow connections between the components of the system of FIG. 1.

A fuel cell consists of two electrodes, an anode and a cathode, separated by an electrolyte, and each electrode is in contact with a respective gas stream. Chemical reactions that take place at the electrodes cause ions to migrate through the electrolyte, and generate an electric current in an external circuit. It is customary to arrange fuel cells in stacks, to obtain a larger voltage or power output than is available from a single fuel cell. Each such fuel cell stack must be supplied with appropriate fluids. For example the electrolyte may be an aqueous solution of potassium hydroxide (KOH), and the gas streams may be hydrogen, and air or oxygen. In the system described below a KOH electrolyte and an air stream are passed in parallel through the fuel cell stacks, while a separate hydrogen stream is supplied in parallel to each cell stack, with no through-flow.

Referring now to FIG. 1, a system 10 of the invention is shown in which sixteen fuel cell stack modules 11 are arranged at four different heights, with a set of four fuel cell stack modules 11 at each different height. The four modules 11 of each set are level with each other. The system also includes four different constant head tanks 12, one for each of the sets of modules 11. Considering each constant head tank 12, electrolyte is fed out through an outlet duct 14 which branches into two ducts 15 at a T-junction, and each of these ducts 15 branches into another two ducts 16 at another T-junction. The ducts 16 feed into the four modules 11. The lengths and diameters of the ducts 16 are all equal; and the lengths and diameters of the ducts 15 are all equal; so the flow paths from the constant head tank 12 to each module 11 are all hydraulically equivalent.

Each cell stack module 11 has an inlet for electrolyte to which the respective duct 16 is connected via a shut-off valve 40 that is normally open. Each module 11 also has an outlet 19a near its base for electrolyte, which connects with an outlet duct 44 (shown in FIG. 2). Each module 11 also has an inlet port 19b for air (communicating with the inlet duct 34 shown in FIG. 2) and an outlet port 19c for air (communicating with the outlet exhaust pipe 38 shown in FIG. 2); and an inlet port 19d for hydrogen and an outlet port 19e for hydrogen. The ducts for carrying hydrogen and air are not shown in FIG. 1, for clarity.

Between the shut-off valve 40 and the electrolyte inlet of the module 11 is a T-junction, arranged so that a drain pipe 45 branches off from the duct 16, and the drain pipe 45 incorporates a valve 46 that is normally closed. The drain pipe 45 extends down to an electrolyte storage tank 20. In operation, if the shut-off valve 40 is closed for any reason, so preventing electrolyte flowing into the module 11, then the valve 46 would normally be opened to allow electrolyte that is within the module 11 to drain down into the electrolyte storage tank 20.

Referring also to FIG. 2, each constant head tank 12 has an overflow duct 18 that carries excess electrolyte down to the constant head tank 12 at the next level down; the overflow duct 18 from the lowest constant head tank 12 feeds into the electrolyte storage tank 20. A pump 24 is connected to the electrolyte storage tank 20, and supplies electrolyte through a riser pipe 26 into the constant head tank 12 at the highest level. In this example of the riser pipe 26 is shown as feeding the electrolyte into the top of the constant head tank 12, but in a modification it may instead feed the electrolyte into the side or the bottom of the highest constant head tank 12.

In use the electrolyte storage tank 20 contains electrolyte, aqueous potassium hydroxide (KOH) in this example. Referring in particular to FIG. 2, in which the connections are shown diagrammatically, within each constant head tank 12 the overflow duct 18 extends upwardly to about 25 mm below the top of the tank 12. The overflow duct 18 is open at both ends, and is of sufficiently large diameter to ensure that the electrolyte level within the tank 12 cannot rise significantly above the top of the overflow duct 18. There is a small aperture 28 in the top of each constant head tank 12 so that the space above the electrolyte is occupied by air, and this aperture 28 ensures that the surface of the electrolyte within the constant head tank 12 is at atmospheric pressure. During operation of the system 10 each of the constant head tanks 12 therefore contains aqueous potassium hydroxide electrolyte up to the level of the top of the overflow duct 18, and excess electrolyte flows through each of the overflow ducts 18 and back to the electrolyte storage tank 20.

As shown in FIG. 2, each module 11 consists of a box 30 that encloses a fuel cell stack 32 whose electrode plates (represented diagrammatically) extend in vertical planes. Air is fed under pressure from an air supply duct (not shown) into each fuel cell stack 32 through an inlet duct 34 (which communicates with the inlet port 19b shown in FIG. 1). In this example the air is fed into the stack 32 near the top at the left hand end (as shown), flowing downwardly through the appropriate electrode chambers and emerging from an exhaust port 36 near the bottom at the right-hand end, which may incorporate a restrictor valve. The air emerges into the box 30, and is then exhausted via the air outlet port 19c into an air exhaust duct 38 that extends upwardly and is open at its upper end. One such air exhaust duct 38 is provided for four modules 11 that are one above the other.

The electrolyte supply duct 16 supplies electrolyte to the fuel cell stack 32 through a port 41 near the bottom at the left hand end (as shown). The electrolyte flows upwardly through the electrolyte chambers, and emerges from an outlet port 42 near the top at the right-hand end, which may incorporate a restrictor valve. The electrolyte emerges into the box 30, typically as a trickle, and flows out of an electrolyte outlet duct 44 which returns the electrolyte to the electrolyte storage tank 20 through a return pipe (not shown for the top three modules 11).

Each module 11 is also provided with a fuel gas, such as hydrogen, through a fuel gas feed duct (not shown) and the hydrogen inlet port 19d. If there is any leakage of the fuel gas from the fuel cell stack 32, it will be carried along with the air flow through the air exhaust duct 38 and thereby diluted. The system 10 may incorporate a hydrogen sensor 48 at the air outlet from the box 30 to detect any hydrogen in the air flow.

Thus in operation of the system 10 each module 11, and so each fuel cell stack 32, is provided with the requisite supplies of fuel gas, air and electrolyte. Variation in the pressure of the electrolyte within the fuel cell stack 32 is minimised because the electrolyte pressure at the inlet to each fuel cell stack 32 corresponds to a constant head of electrolyte, that provided by the difference in height between the top of the overflow pipe 18 and the port 41. The pressure at which the electrolyte emerges from the fuel cell stack 32 is the pressure within the box 30, which is only slightly above atmospheric pressure (because the air exhaust duct 38 is open at its upper end).

Considering the system 10 as a whole, the pump 24 supplies more electrolyte to the highest constant head tank 12 than is required by all the modules 11 in the entire system 10. Within each constant head tank 12 there is therefore excess electrolyte. The excess electrolyte is returned to the electrolyte storage tank 20 through the overflow pipes 18, while used electrolyte is returned to the electrolyte storage tank 20 via the boxes 30 and the electrolyte outlet ducts 44.

If a problem arises with one of the modules 11, for example failure of a cell, or leakage of hydrogen, or if one of the modules 11 is due for servicing, then the supplies of gas and of electrolyte to that module 11 can be turned off. In particular, the shut-off valves 40 enable the supply of electrolyte to an individual module 11 to be shut-off without affecting the supply of electrolyte to other modules 11 either at the same level or at different levels in the system 10. Opening the valve 46 allows the electrolyte within the fuel cell stack 32 to drain out, flowing back out of the port 41, and through the valve 46 and the drain pipe 45, and so returning to the electrolyte storage tank 20.

It will be appreciated that an electrolyte supply system 10 may differ from that described above, while remaining within the scope of the present invention as defined by the claims. For example there might be a different number of modules 11 at each level—this would typically be between 2 and 6 modules, for example 5 modules. As shown in the drawings, each overflow duct 18 is of the same diameter, but in a modification the overflow ducts 18 might be of smaller diameter at the lower levels, because the quantity of excess electrolyte is less.

It will also be appreciated that the system 10 may be used with electrolysis cell stacks, or with flow batteries.

What is claimed:

1. A system for supplying a liquid electrolyte to cell stacks arranged at a plurality of different heights, with a plurality of cell stacks at each different height, each cell stack comprising a stack of cells with electrodes extending in vertical planes; the system comprising a plurality of supply tanks for containing liquid electrolyte, one for each of the different heights, each supply tank having an opening to ensure that the surface of the liquid electrolyte is at atmospheric pressure and connected by feed ducts to feed electrolyte to the plurality of cell stacks at that height; an electrolyte storage tank, and means to supply electrolyte from the electrolyte storage tank to the highest supply tank; wherein each supply tank incorporates an overflow weir and an outlet duct communicating with the weir, for each supply tank except the lowest supply tank the outlet duct being arranged to supply overflowing electrolyte to a supply tank at a lower height, wherein the electrolyte storage tank is below the lowest supply tank, and the outlet duct from the lowest supply tank feeds into the electrolyte storage tank; and wherein the cell stacks are cell stacks, through which electrolyte flows continuously, in operation, between an inlet and an outlet of each cell stack, and out-flowing electrolyte from the outlet of each cell stack is returned through a cell stack outflow duct to the electrolyte storage tank.

2. A system as claimed in claim 1 wherein each cell stack includes a flow restrictor at the outlet to restrict outflow of the electrolyte.

3. A system as claimed in claim 1 wherein the plurality of cell stacks at the same height are fed from the same supply tank by respective feed ducts that are hydraulically equivalent.

4. A system as claimed in claim 1 wherein the means to supply electrolyte to the highest supply tank comprises a pump.

5. A system as claimed in claim 1 wherein each cell stack is surrounded by an enclosure into which the out-flowing electrolyte flows, the enclosure being provided with the cell stack outflow duct to return the electrolyte to the electrolyte storage tank.

6. A system as claimed in claim 1 wherein the cell stacks are fuel cell stacks to which a through flow of air is to be supplied, wherein each cell stack is surrounded by an enclosure and wherein the air is collected in the enclosure surrounding the cell stack, and is extracted through an exhaust outflow duct.

7. A system as claimed in claim 6 also comprising a sensor to detect any fuel gas present in the extracted air.

8. A system as claimed in claim 1 wherein each cell stack is connected to the supply tank at the same height by a feed duct, which incorporates a shut-off valve to shut off electrolyte flow to the cell stack.

9. A system as claimed in claim 6 wherein each cell stack is connected to the supply tank at the same height by a feed duct, which incorporates a shut-off valve to shut off electrolyte flow to the cell stack.

10. A system as claimed in claim 8 wherein a junction is provided within the feed duct between the shut-off valve and the cell stack, the junction providing communication between the feed duct and a drain pipe with a drain valve, and the drain pipe communicating with the electrolyte storage tank.

11. A system as claimed in claim 9 wherein a junction is provided within the feed duct between the shut-off valve and the cell stack, the junction providing communication between the feed duct and a drain pipe with a drain valve, and the drain pipe communicating with the electrolyte storage tank.

* * * * *